(12) United States Patent
Wada et al.

(10) Patent No.: US 12,105,387 B2
(45) Date of Patent: Oct. 1, 2024

(54) DISPLAY DEVICE AND METHOD OF MANUFACTURING DISPLAY DEVICE

(71) Applicant: Sharp Display Technology Corporation, Kameyama (JP)

(72) Inventors: Hiroaki Wada, Kameyama (JP); Junichi Mori, Kameyama (JP); Takumi Tomita, Kameyama (JP); Kenichi Nishimura, Kameyama (JP); Hiroto Akiyama, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/140,070

(22) Filed: Apr. 27, 2023

(65) Prior Publication Data
US 2024/0077772 A1  Mar. 7, 2024

(30) Foreign Application Priority Data

May 6, 2022  (JP) ................................. 2022-076447

(51) Int. Cl.
| | | |
|---|---|---|
| *G02F 1/1343* | (2006.01) | |
| *G02F 1/135* | (2006.01) | |
| *G02F 1/1362* | (2006.01) | |

(52) U.S. Cl.
CPC ........ *G02F 1/1351* (2021.01); *G02F 1/13439* (2013.01); *G02F 1/136286* (2013.01)

(58) Field of Classification Search
CPC ..................................................... G02F 1/1343
See application file for complete search history.

(56) References Cited

U.S. PATENT DOCUMENTS

| | | | | |
|---|---|---|---|---|
| 2009/0122212 A1* | 5/2009 | Lee | ...................... | G02F 1/13454 349/122 |
| 2009/0325376 A1* | 12/2009 | Nakamura | ............ | H01L 27/124 438/618 |
| 2014/0120643 A1* | 5/2014 | Kim | .................. | G02F 1/136277 438/30 |
| 2017/0133413 A1* | 5/2017 | Park | ....................... | G02F 1/1368 |

FOREIGN PATENT DOCUMENTS

JP  2000137244 A  5/2000

* cited by examiner

*Primary Examiner* — Sang V Nguyen
(74) *Attorney, Agent, or Firm* — ScienBiziP, P.C.

(57) ABSTRACT

A display device includes: a first substrate, a second substrate, a light-blocking portion, a pixel, and a wiring line. The second substrate has a main face opposite a main face of the first substrate. The light-blocking portion is disposed on the main face of the first substrate, including an opening, and blocking light. The pixel is disposed on the main faces of the first substrate and the second substrate and delimited by at least a part of the opening. The wiring line is disposed on the main face of the second substrate and at least partially overlapping the opening. The wiring line has a projection protruding toward a first substrate side. The projection has a surface including a curved surface and comprises a plurality of projections disposed at intervals in locations overlapping at least the opening.

8 Claims, 10 Drawing Sheets

DISPLAY DEVICE AND METHOD OF MANUFACTURING DISPLAY DEVICE

CROSS-REFERENCE TO RELATED APPLICATIONS

This application claims the benefit of priority to Japanese Patent Application Number 2022-076447 filed on May 6, 2022. The entire contents of the above-identified application are hereby incorporated by reference.

BACKGROUND

The present specification discloses technology that relates to display devices and methods of manufacturing display devices.

TECHNICAL FIELD

Japanese Unexamined Patent Application Publication, Tokukai, No. 2000-137244 below describes a conventionally known example of the liquid crystal display device. This display device described in Japanese Unexamined Patent Application Publication, Tokukai, No. 2000-137244 includes a metal light-blocking film including: a low-resistance layer for lowering the resistance of an auxiliary capacitor line; a low-reflectance light-blocking layer for shielding the auxiliary capacitor line from light; and a barrier metal layer for restraining alloying reaction of these layers, in order to restrain alloying of the metal light-blocking film and to at the same time reduce the inherent resistance of the metal light-blocking film.

SUMMARY

In the liquid crystal display device described in Japanese Unexamined Patent Application Publication, Tokukai, No. 2000-137244, the low-reflectance light-blocking layer is added to the metal light-blocking film to restrain reflection of light, and the barrier metal layer is also added to the metal light-blocking film to restrain alloying reaction of the low-resistance layer and the low-reflectance light-blocking layer. As described here, this technique of adding a low-reflectance light-blocking layer and a barrier metal layer could create significant constraints in the manufacturing process and may in some cases not be used due to manufacturing equipment, manufacturing cost, and other problems.

The present specification describes technology completed in view of these circumstances and has an object to restrain display quality from falling due to reflection of light without having to add a new metal film to a wiring line.

(1) The technology described in the present specification is directed to a display device including: a first substrate; a second substrate having a main face opposite a main face of the first substrate; a light-blocking portion disposed on the main face of the first substrate, including an opening, and blocking light; a pixel disposed on the main faces of the first substrate and the second substrate and delimited by at least a part of the opening; and a wiring line disposed on the main face of the second substrate and at least partially overlapping the opening, wherein the wiring line has a projection protruding toward a first substrate side, and the projection has a surface including a curved surface and includes a plurality of projections disposed at intervals in locations overlapping at least the opening.

(2) The foregoing display device is configured as in (1) above and may further include an underlying portion on an underlying side of the wiring line on the main face of the second substrate, wherein the underlying portion includes a plurality of underlying portions disposed in locations overlapping the plurality of projections.

(3) The foregoing display device is configured as in (2) above and may be further configured such that the underlying portion has a ratio of a height thereof to a thickness of the wiring line, the ratio being from 0.22 to 1.67.

(4) The foregoing display device is configured as in any of (1) to (3) above and may be further configured such that the plurality of projections are disposed at intervals in both a length direction of the wiring line and a width direction of the wiring line, the intervals being shorter than a width of the wiring line.

(5) The technology described in the present specification is directed to a method of manufacturing a display device, the method including: providing a light-blocking portion on a main face of a first substrate, the light-blocking portion having an opening at least partially delimiting a pixel and blocking light; providing a wiring line on a main face of a second substrate, the wiring line at least partially overlapping the opening; placing the main faces of the first substrate and the second substrate opposite to each other; and providing a plurality of projections at intervals in locations overlapping at least the opening on a part of the wiring line, the plurality of projections protruding toward a first substrate side and having a surface including a curved surface.

(6) The foregoing method is configured as in (5) above and may further include, before the wiring line is provided, forming and patterning an underlying film to provide a plurality of underlying portions at intervals on the second substrate.

(7) The foregoing method is configured as in (6) above and may further include: after the underlying film is formed, forming an amorphous transparent electrode film on the second substrate; after the transparent electrode film is partially crystallized, selectively removing amorphous parts of the transparent electrode film; and etching the underlying film using crystallized parts that are left unremoved as a mask.

(8) The foregoing method is configured as in (7) above and may be further configured such that in partially crystallizing the transparent electrode film, the transparent electrode film is heated at 150° C. to 300° C. for at least 20 minutes.

(9) The foregoing method is configured as in (6) above and may further include: after the underlying film is formed, forming a photoresist film on the second substrate; after the photoresist film is partially exposed to light, developing the photoresist film; and etching the underlying film using the photoresist film that is developed as a mask.

The technology described in the present specification can restrain display quality from falling due to reflection of light without having to add a new metal film to a wiring line.

DESCRIPTION OF EMBODIMENTS

Embodiment 1

Embodiment 1 is described with reference to FIGS. 1 to 11. The present embodiment discusses a liquid crystal panel (display device) 10 as an example. Some of the figures show a common set of an X axis, a Y axis, and a Z axis and are drawn to match the directions indicated by these axes.

Figure 1:
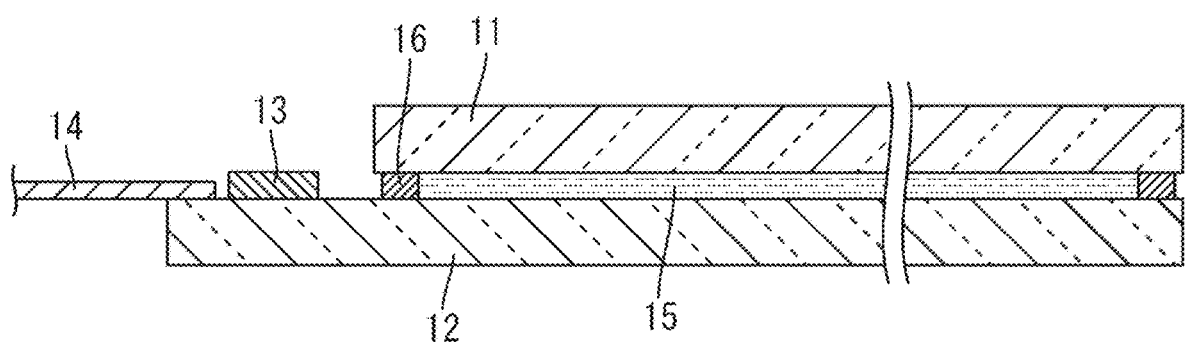
FIG. 1 is a schematic cross-sectional view of a liquid crystal panel in accordance with Embodiment 1.
Figure 1:
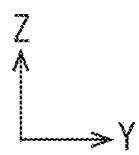

A brief description is given of a structure of the liquid crystal panel 10 with reference to FIG. 1. The liquid crystal panel 10 in accordance with the present embodiment has a main face extending in both X-axis and Y-axis directions as shown in FIG. 1. The direction of the normal to the main face of the liquid crystal panel 10 matches the Z-axis direction. The liquid crystal panel 10 is capable of displaying images by utilizing the illumination light emitted by a backlight device (lighting device). The liquid crystal panel 10 has, in the center of the screen, a display area where images are displayed. The liquid crystal panel 10 has, along the frame-shaped peripheral section of the screen that surrounds the display area, a non-display area where no images are displayed.

The liquid crystal panel 10 includes a pair of almost fully transparent substrates 11, 12 made of glass with excellent transparency as shown in FIG. 1. One of the two substrates 11, 12 that is disposed on the front side is the opposite substrate (first substrate or CF substrate) 11, and the other one of the substrates 11, 12 that is disposed on the back side is the array substrate (second substrate or thin film transistor substrate) 12. Both the opposite substrate 11 and the array substrate 12 include a stack of various films on the inner surface of a glass substrate (substrate). The array substrate 12, which is one of these two substrates, has a greater long-side dimension than does the opposite substrate 11. One of the ends of the array substrate 12 with respect to the long-side direction thereof does not overlap the opposite substrate 11 and has a driver (signal supply section) 13 and a flexible substrate 14 mounted thereto. The driver 13 includes an LSI chip including a drive circuit therein. The driver 13 processes various signals transmitted by the flexible substrate 14. The driver 13 is mounted to the array substrate 12 by COG (chip on glass) technology. The flexible substrate 14 includes: a base member made of an electrically insulating and flexible synthetic resin material (e.g., polyimide-based resin); and a pattern of numerous wiring lines (not shown) formed on the base member. The flexible substrate 14 is connected to the array substrate 12 through one of the ends thereof and to an external control board (signal supply source) through the other one of the ends thereof. The various signals supplied from the control board are transmitted to the liquid crystal panel 10 via the flexible substrate 14.

The liquid crystal panel 10 includes a liquid crystal layer (medium layer) 15 injected into an internal space between the pair of substrates 11, 12 as shown in FIG. 1. The liquid crystal layer 15 contains liquid crystal molecules, which is a substance that changes optical properties when placed under an applied electric field. The liquid crystal layer 15 is sealed by a sealing section 16 enclosing the internal space between the pair of substrates 11, 12. The sealing section 16 is disposed in the non-display area and formed like a rectangular frame (like an endless circle) to enclose all the internal space between the pair of substrates 11, 12. A pair of polarizers is attached to the outer faces of the pair of substrates 11, 12.

Figure 2:
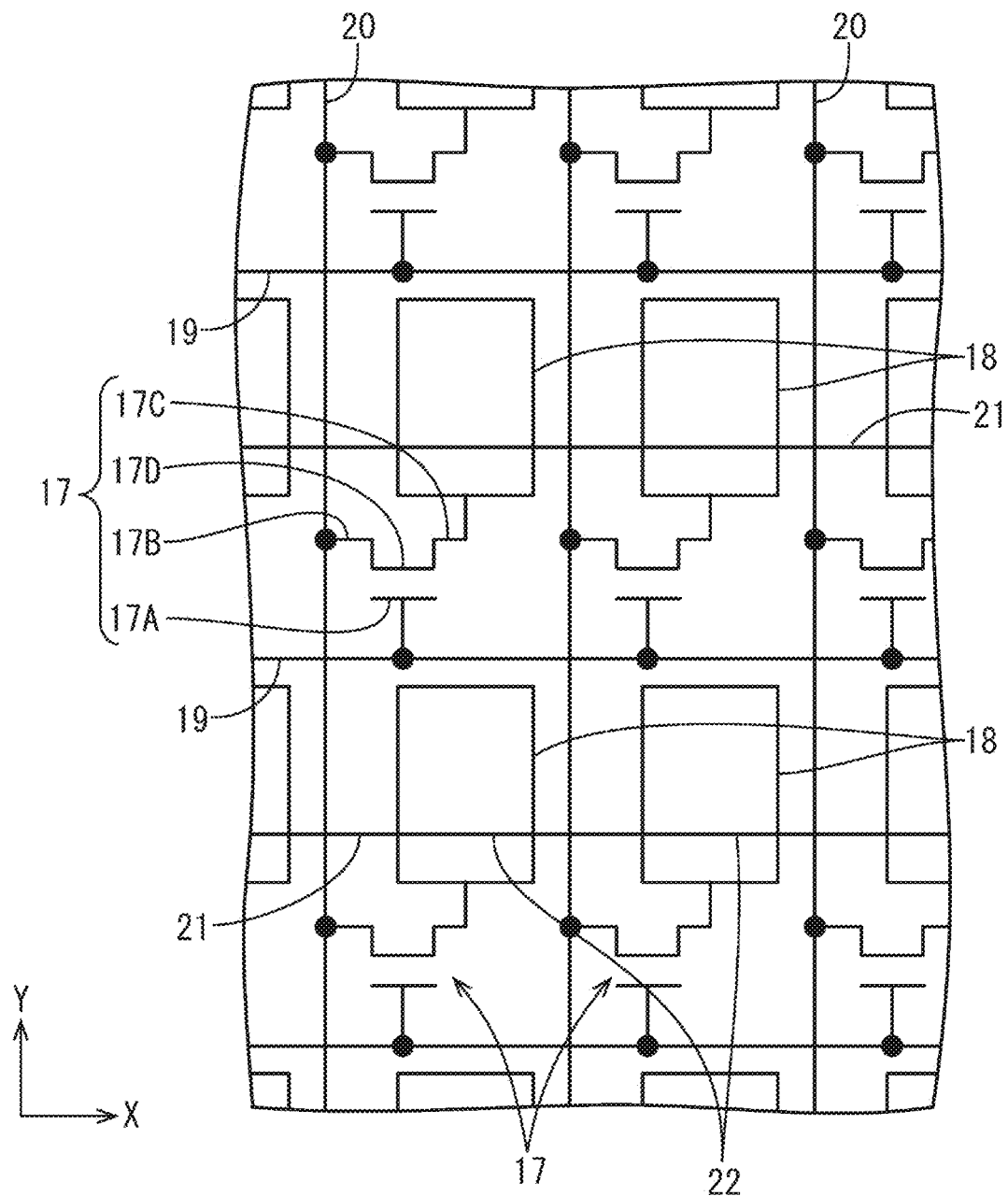
FIG. 2 is a circuit diagram representing a pixel arrangement in a display area of an array substrate in the liquid crystal panel.

A description is given of a pixel arrangement in a display area of the array substrate 12 with reference to FIG. 2. A plurality of TFTs (thin film transistors, switching elements) 17 and a plurality of pixel electrodes 18 are arranged on the inner surface of the display area of the array substrate 12, separated by in-plane intervals on the array substrate 12, as shown in FIG. 2. The plurality of TFTs 17 and the plurality of pixel electrodes 18 are arranged in respective matrices (like matrices) with respective intervals therebetween in the X-axis direction (first direction) and the Y-axis direction (second direction), the X-axis direction and the Y-axis direction being orthogonal to each other. A lattice of gate lines (wiring lines, scan lines) 19 and source lines (signal wiring lines) 20 is disposed surrounding the TFTs 17 and the pixel electrodes 18. The gate lines 19 are extended in the X-axis direction and separated by intervals from each other so as to sandwich the pixel electrodes 18 therebetween in the Y-axis direction. The source lines 20 are extended in the Y-axis direction and separated by intervals from each other so as to sandwich the pixel electrodes 18 therebetween in the X-axis direction.

As shown in FIG. 1, the gate lines 19 are connected to respective gate electrodes 17A in the plurality of TFTs 17 arranged in the X-axis direction, whereas the source lines 20 are connected to respective source electrodes 17B in the plurality of TFTs 17 arranged in the Y-axis direction. The pixel electrodes 18 are connected to drain electrodes 17C in the TFTs 17. Each TFT 17 includes a semiconductor section 17D in addition to the gate electrode 17A, the source electrode 17B, and the drain electrode 17C described above. The semiconductor section 17D is made of a semiconductor material and connected to the source electrode 17B and the drain electrode 17C. When driven on the basis of a scan signal supplied to the gate line 19, the TFT 17 charges the pixel electrode 18 to an electrical potential based on an image signal (data signal) supplied to the source line 20.

On the inner surface of the display area of the array substrate 12 are there provided capacitor lines (wiring lines, auxiliary capacitor lines) 21 in addition to the gate lines 19 and the source lines 20 described above as shown in FIG. 2. Each capacitor line 21 extends parallel to the X-axis direction, that is, parallel to the gate line 19. The capacitor line 21 intersects with the source line 20 and traverses the pixel electrode 18. The capacitor line 21 is separated from the gate line 19 by an interval with reference to the Y-axis direction. The interval separating the capacitor line 21 from the gate line 19 is shorter than the length of the pixel electrode 18 in the Y-axis direction. A part of the capacitor line 21 that overlaps the pixel electrode 18 constitutes a capacitance-forming portion 22. The capacitor line 21 traverses all the plurality of pixel electrodes 18 arranged next to each other in the X-axis direction and includes a plurality of capacitance-forming portions 22 (as many as those pixel electrodes 18 arranged in the X-axis direction) so as to overlap these pixel electrodes 18 respectively. A plurality of capacitor lines 21 are arranged next to each other and separated by intervals from each other in the Y-axis direction to sandwich the gate lines 19 therebetween. The intervals between the plurality of capacitor lines 21 are equal to the length of the pixel electrode 18 in the Y-axis direction. The capacitor lines 21 are equal in number to the gate lines 19 and to the number of those pixel electrodes 18 arranged in the Y-axis direction). The capacitor line 21 is maintained at a prescribed electrical potential (which may, for example, be equal to the electrical potential of a common electrode 26 detailed later or to an electrical potential that differs by a particular value from the electrical potential of the common electrode 26). When the pixel electrode 18 is charged, this electrical potential is maintained because an electrostatic capacity is formed between the capacitance-forming portion 22 and the overlapping pixel electrode 18.

Figure 3:
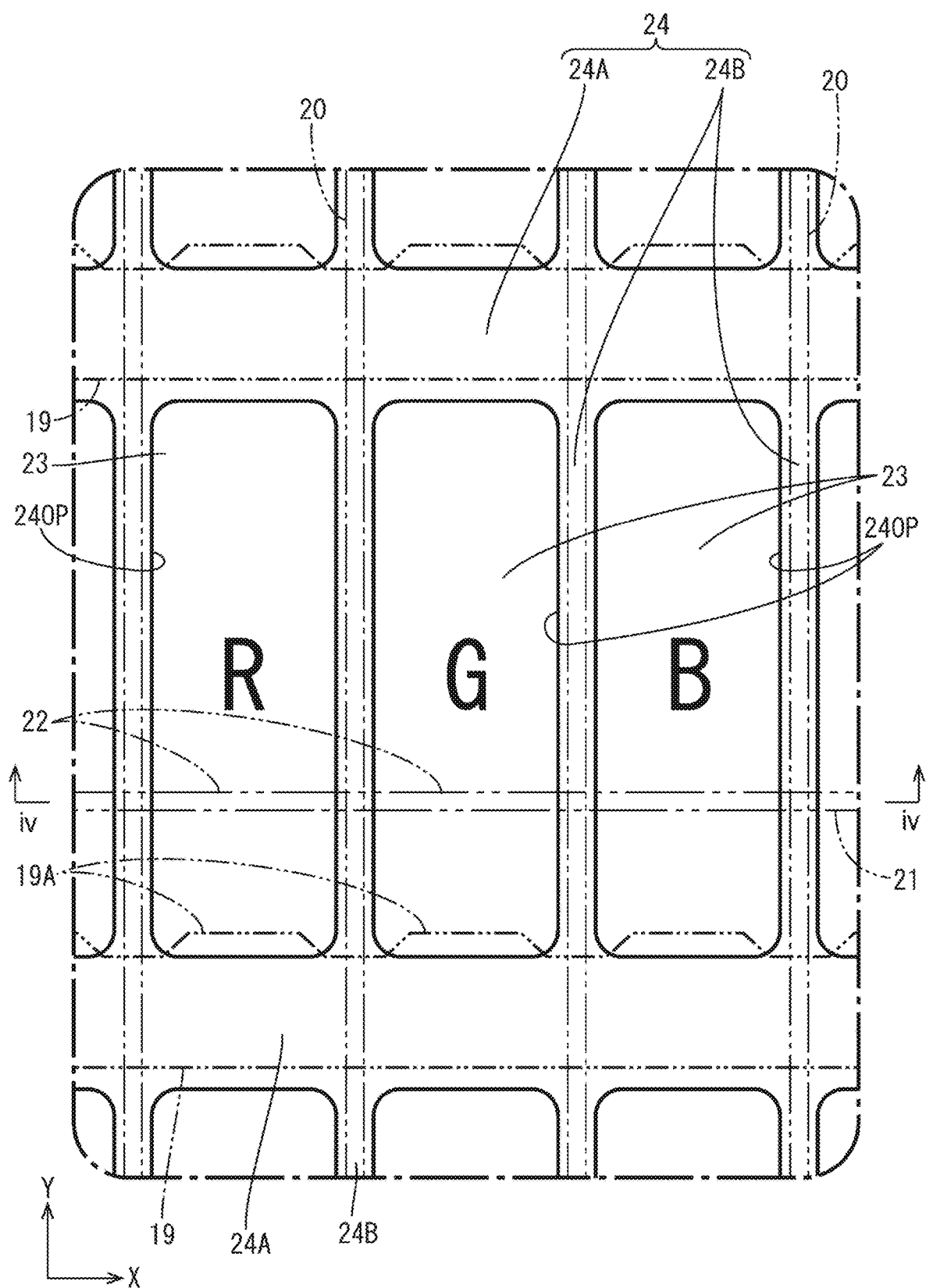
FIG. 3 is a plan view of a display area of an opposite substrate in the liquid crystal panel.

A description is given now of the arrangement of pixels in the display area of the opposite substrate 11 with reference to FIG. 3. There are provided color filters 23 and a light-blocking portion (interpixel light-blocking portion, black matrix) 24 on the inner surface of the display area of the opposite substrate 11 as shown in FIG. 3. In FIG. 3, the gate lines 19, the source lines 20, and the capacitor lines 21, which are structural components of the array substrate 12, are shown by dash-double-dot lines. Each the color filter 23 comes in blue (B), green (G), or red (R). A plurality of color filters 23 that have different colors from each other are arranged next to each other in the X-axis direction (the extension direction of the gate lines 19). A plurality of color filters 23 that have different colors from each other extend in the Y-axis direction (the extension direction of the source lines 20). As described here, a plurality of color filters 23 that have different colors from each other are arranged generally like stripes.

The light-blocking portion 24 is made of a light-blocking material that blocks light (e.g., a photosensitive resin material, such as acrylic or polyimide, containing a pigment such as carbon black). The light-blocking portion 24 is capable of blocking the light emitted by, for example, a backlight device primarily by absorbing the light. In the display area, the light-blocking portion 24 is shaped generally like a lattice in a plan view as shown in FIG. 3. The light-blocking portion 24 provides partitions between the adjacent pixel electrodes 18. The light-blocking portion 24 is disposed so as to overlap at least the gate lines 19 and the source lines 20 on the array substrate 12 side in a plan view. The light-blocking portion 24 is provided also in the non-display area of the opposite substrate 11 and is located substantially all across the non-display area.

In the display area, the light-blocking portion 24, as shown in FIG. 3, includes: a first light-blocking portion 24A extended in the X-axis direction; and a second light-blocking portion 24B extended in the Y-axis direction and intersecting with the first light-blocking portion 24A. The first light-blocking portion 24A and the second light-blocking portion 24B have the intersecting sites thereof connected together. The number of the first light-blocking portion 24A provided is equal to the number of the gate lines 19 provided. The number of the second light-blocking portion 24B provided is equal to the number of the source lines 20 provided. The first light-blocking portion 24A has a larger width than the second light-blocking portion 24B. The first light-blocking portion 24A overlaps many parts of the gate lines 19. The first light-blocking portion 24A does not overlap some parts of the gate lines 19. A portion of each gate line 19 is flanked by those two of the source lines 20 with which the gate line 19 intersect and includes a widened portion 19A that has a larger width than a portion of the gate line 19 where the gate line 19 intersects with the source line 20. The widened portion 19A does not overlap the first light-blocking portion 24A. Note that the first light-blocking portion 24A may overlap parts of the TFTs 17 or the entire regions of the TFTs 17. The second light-blocking portion 24B has a smaller width than the first light-blocking portion 24A. The second light-blocking portion 24B overlaps the almost entire regions of the source lines 20 and parts of the capacitor lines 21. Note that the second light-blocking portion 24B may overlap some parts of the TFTs 17. The second light-blocking portion 24B overlap those parts of the capacitor lines 21 which intersect with the source lines 20.

The light-blocking portion 24, as shown in FIG. 3, includes openings (pixel openings) 240P. The openings 240P in the light-blocking portion 24 are the regions surrounded by two of the first light-blocking portion 24A and two of the second light-blocking portion 24B and are shaped substantially like a vertically elongated rectangle in a plan view. The openings 240P in the light-blocking portion 24 overlap many parts of the pixel electrodes 18 or the entire regions of the pixel electrodes 18. The openings 240P in the light-blocking portion 24 separated by a distance both in the X-axis direction and in the Y-axis direction so as to form a matrix. The light transmitted through the pixel electrode 18 and the color filter 23 passes through the opening 240P in the light-blocking portion 24 and leaves the liquid crystal panel 10 to the outside. The widened portion 19A of the gate line 19 overlaps the opening 240P in the light-blocking portion 24. The portion of the capacitor line 21 which traverses the pixel electrode 18 (the portion flanked by two of the source lines 20; the capacitance-forming portion 22) overlaps the opening 240P in the light-blocking portion 24.

Figure 4:
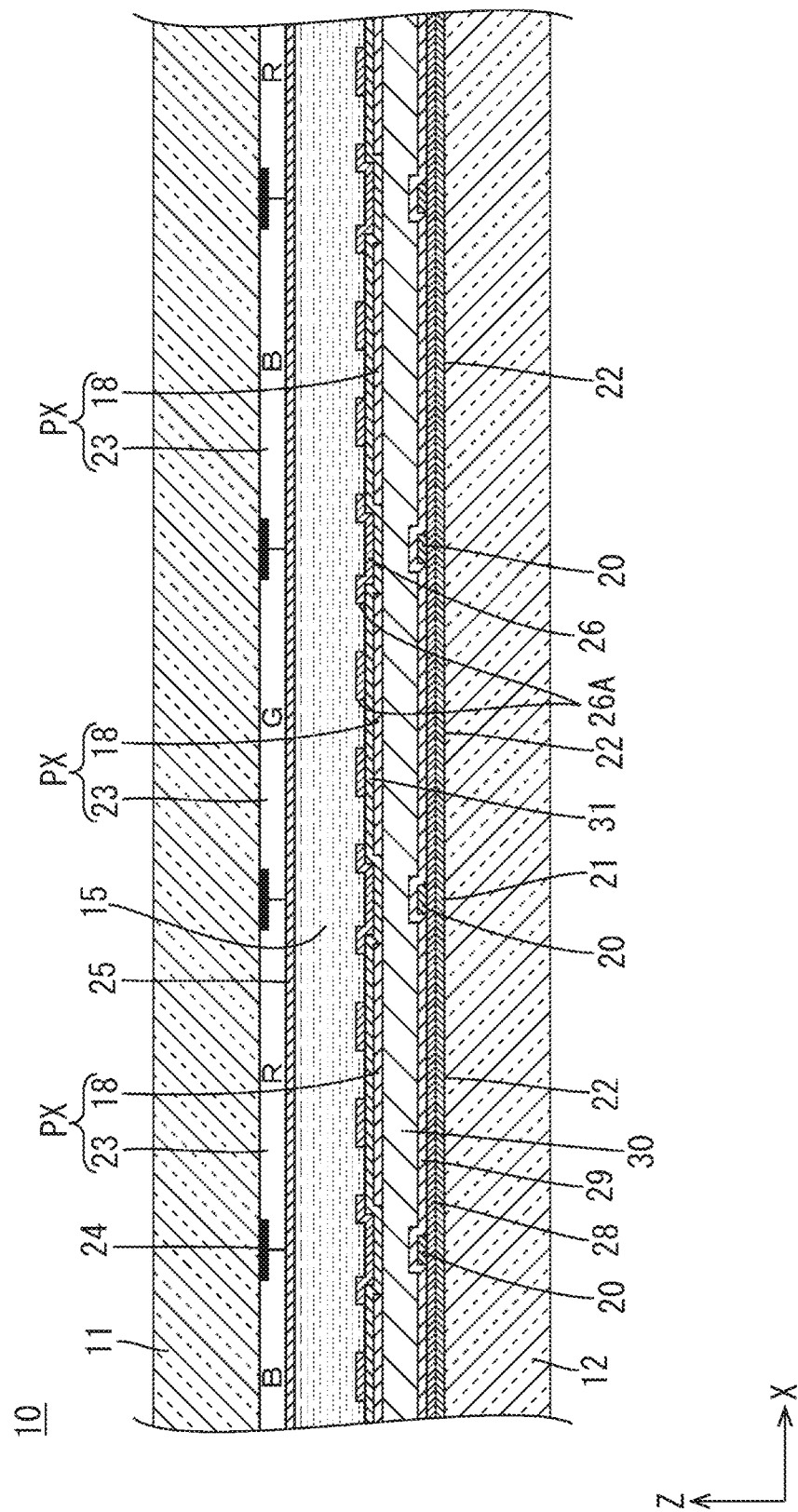
FIG. 4 is a cross-sectional view of the liquid crystal panel taken along line iv-iv shown in FIG. 3.

A description is given now of a cross-sectional structure, taken in the X-axis direction, of the pixel electrode 18 (pixel PX) of the liquid crystal panel 10 with reference to FIG. 4. FIG. 4 shows a cross-sectional structure in a location overlapping the capacitor line 21. The color filter 23 of the opposite substrate 11, as shown in FIG. 4, overlaps the pixel electrode 18 of the array substrate 12 in a plan view. In the opposite substrate 11, the plurality of color filters 23 of different colors have their boundaries (color boundaries) overlapping the source lines 20 of the array substrate 12. In this liquid crystal panel 10, the red, green, and blue color filters 23 arranged next to each other in the X-axis direction and the three pixel electrodes 18 disposed opposite the corresponding color filters 23 constitute the pixels PX of the three colors. This liquid crystal panel 10 includes display pixels capable of a color display with prescribed gray levels by the pixels PX of the three colors (R, G, B) arranged adjacent to each other in the X-axis direction. The pixels PX have a pitch in the Y-axis direction that is approximately three times the pitch thereof in the X-axis direction. The plurality of openings 240P in the light-blocking portion 24 overlap the respective pixels PX. In other words, the pixels PX are delimited by the openings 240P in the light-blocking portion 24. In the light-blocking portion 24, the number of the openings 240P is equal to the number of the pixels PX. The first light-blocking portion 24A, which is a part of the light-blocking portion 24, provides partitions between the two pixels PX that are adjacent in the Y-axis direction (see FIG. 3). The second light-blocking portion 24B provides partitions between the two pixels PX (color filters 23) that are adjacent in the X-axis direction. In addition, on the overlying side (the liquid crystal layer 15 side, the array substrate 12 side) of the color filters 23 of the opposite substrate 11, an overcoat film 25 is provided all across the substantially entire region of the opposite substrate 11 for planarization.

Subsequently, the pixel electrodes 18 and the common electrode 26 of the array substrate 12 will be described. On the inner surface of the display area of the array substrate 12, as shown in FIG. 4, the common electrode 26 is provided on the overlying side of the pixel electrodes 18 so as to overlap all the pixel electrodes 18. The common electrode 26 is extended across the substantially entire region of the display area. A common wire is connected to the common electrode 26 to supply, through the common wire, a common potential signal (reference potential signal) that has a common potential (reference potential). The flexible substrate 14 is connected to the common wire to supply the common potential signal from the control board (see FIG. 1). Each portion of the common electrode 26 which overlaps the pixel electrodes 18 has a plurality of slits 26A formed therein. Note that, for example, the specific number of the slits 26A shown in the figure may be changed where appropriate. As the pixel electrode 18 is charged in driving the TFT 17, an electrical potential difference develops between the overlapping pixel electrode 18 and common electrode 26. In response, a fringe field (oblique electric field) that has a component normal to the substrate face of the array substrate 12 in addition to a component parallel to the substrate face of the array substrate 12 develops between the pixel electrode 18 and the opening edge of the slit 26A. The alignment of the liquid crystal molecules in the liquid crystal layer 15 can be controlled through this fringe field. In other words, the liquid crystal panel 10 in accordance with the present embodiment operates in FFS (fringe field switching) mode. In addition, an alignment film is provided on each of the innermost faces of the opposite substrate 11 and the array substrate 12 to align the liquid crystal molecules in the liquid crystal layer 15.

A description is given here of various stacked films on the inner surface of the array substrate 12 with reference to FIG. 4. On the array substrate 12, a first metal film (first conductive film), a gate insulating film 28, a semiconductor film, a second metal film (second conductive film), a first interlayer insulating film 29, a planarization film 30, a first transparent electrode film, a second interlayer insulating film 31, a second transparent electrode film, and an alignment film are stacked in this order when viewed from the underlying side (glass substrate side) as shown in FIG. 4. On the array substrate 12 is there also provided an underlying film 27 located in the lowermost layer (underlying side of the first metal film; see FIG. 8).

The first metal film and the second metal film are electrically conductive and light-blocking because each of the first metal film and the second metal film is made of a monolayer film of a single metal material selected from, for example, copper, titanium, aluminum, molybdenum, and tungsten or a stacked films or an alloy of different metal materials. The first metal film provides, for example, the gate lines 19, the capacitor lines 21, and the gate electrodes 17A of the TFTs 17. The second metal film provides, for example, the source lines 20 and the source electrodes 17B and the drain electrodes 17C of the TFTs 17. The semiconductor film includes a thin film of, for example, an oxide semiconductor or an amorphous silicon and provides, for example, the semiconductor sections 17D of the TFTs 17. In particular, the semiconductor film is preferably made of an oxide semiconductor in reducing the size of the TFTs 17 because an oxide semiconductor film can deliver, for example, a higher charging capability than when the semiconductor film is made of an amorphous silicon. The reduction in size of the TFTs 17 allows for an increased aperture ratio of the pixels PX. The first transparent electrode film and the second transparent electrode film are made of a transparent electrode material (e.g., ITO (indium tin oxide) or IZO (indium zinc oxide)). The first transparent electrode film provides, for example, the pixel electrodes 18. The second transparent electrode film provides, for example, the common electrode 26. The alignment film is already described above.

The underlying film 27, the gate insulating film 28, the first interlayer insulating film 29, and the second interlayer insulating film 31 are each made of an inorganic material (inorganic insulating material) such as silicon nitride ($SiN_x$) or silicon oxide ($SiO_2$). The planarization film 30 is made of an organic material (organic insulating material) such as PMMA (acrylic resin). The planarization film 30, which is made of an organic material, has a larger thickness than the gate insulating film 28, the first interlayer insulating film 29, and the second interlayer insulating film 31, which are all made of an inorganic material. This planarization film 30 planarizes the inner face (the face on the liquid crystal layer 15 side) of the array substrate 12. The gate insulating film 28 insulates the first metal film on the underlying side from the semiconductor film and the second metal film on the overlying side. For instance, the intersecting sites of the gate lines 19 and the capacitor lines 21 both made from the first metal film and the source lines 20 made from the second metal film are insulated by the gate insulating film 28. In addition, the overlapping sites of the gate electrodes 17A made from the first metal film and the semiconductor section 17D made from the semiconductor film are insulated by the gate insulating film 28. The first interlayer insulating film 29 and the planarization film 30 insulate the semiconductor film and the second metal film on the underlying side from the first transparent electrode film on the overlying side. For instance, the source lines 20 made from the second metal film is insulated from the pixel electrodes 18 made from the first transparent electrode film by the first interlayer insulating film 29 and the planarization film 30. The second interlayer insulating film 31 insulates the first transparent electrode film on the underlying side from the second transparent electrode film on the overlying side. For instance, the overlapping sites of the pixel electrodes 18 made from the first transparent electrode film and the common electrode 26 made from the second transparent electrode film are insulated by the second interlayer insulating film 31. In addition, the overlapping sites of the capacitor lines 21 made from the first metal film and the pixel electrodes 18 made from the first transparent electrode film are insulated by the gate insulating film 28, the first interlayer insulating film 29, and the planarization film 30.

Meanwhile, those portions of the pixel PX (the opening 240P in the light-blocking portion 24) of the liquid crystal panel 10 in accordance with the present embodiment which overlap the widened portion 19A of the gate line 19 and the capacitor line 21 are shielded from the light from the backlight device by the gate line 19 and the capacitor line 21 respectively as shown in FIG. 3. In contrast, part of the light that enters the liquid crystal panel 10 from the outside on the front side of the liquid crystal panel 10 passes through the opening 240P in the light-blocking portion 24 and strikes and reflects on a part of the gate line 19 and a part of the capacitor line 21. In so doing, if the light undergoes specular reflection, the reflected light could lower display quality. Specifically, if the external light undergoes specular reflection on those parts of the gate line 19 and the capacitor line 21 which overlap the opening 240P despite a black display (minimum gray level display) being produced by the pixel PX, the pixel PX fails to produce a black display due to the reflected light. As a result, contrast performance could fall.

Figure 5:
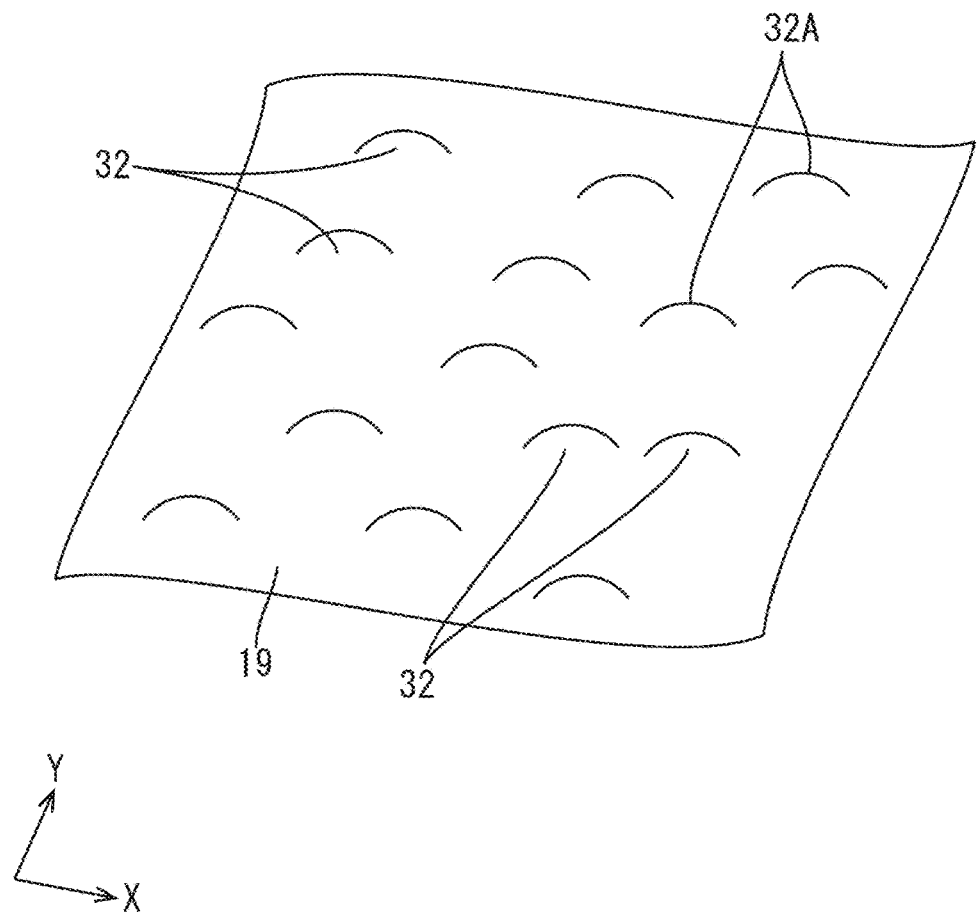
FIG. 5 is a perspective view of a surface of a gate line.
Figure 6:
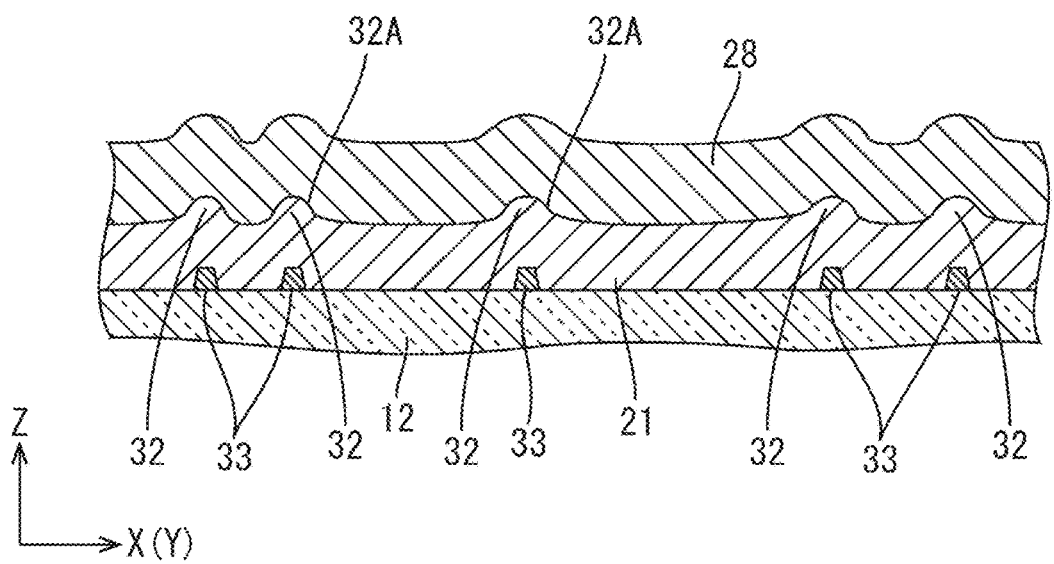
FIG. 6 is a cross-sectional view of an underlying portion of the array substrate, projections of a capacitor line, and a gate insulating film.

In contrast to this, the gate line 19 and the capacitor line 21 of the array substrate 12 in accordance with the present embodiment have projections 32 that protrude toward the front side (the opposite substrate 11 side) as shown in FIGS. 5 and 6. FIG. 5 is an enlarged perspective view of the gate line 19. FIG. 6 is an enlarged cross-sectional view of the capacitor line 21. Note that FIG. 6 shows the structure of the underlying side (the capacitor line 21 and an underlying portion 33) of the gate insulating film 28, including the gate insulating film 28. Each projection 32 is substantially semi-spherical and has a curved surface (spherical surface) 32A on the surface. In the present embodiment, the surface of the projection 32 is a curved surface 32A all across the substantially entire region thereof. A plurality of projections 32 are provided on the entire region of the gate line 19 and on the entire region of the capacitor line 21. Therefore, a plurality of projections 32 are provided at intervals in those locations on the gate line 19 and the capacitor line 21 which overlap the opening 240P in the light-blocking portion 24. More specifically, a plurality of projections 32 are provided at intervals on that widened portion 19A of the gate line 19 which overlaps the opening 240P in the light-blocking portion 24. A plurality of projections 32 are provided at intervals on those portions of the capacitor lines 21 which traverse the pixel electrode 18 (capacitance-forming portion 22), that is, those portions which overlap the opening 240P in the light-blocking portion 24. When the external light that strikes the liquid crystal panel 10 from the outside on the front side of the liquid crystal panel 10 is shone on, for example, the widened portion 19A of the gate line 19 or that portion of the capacitor line 21 which traverses the pixel electrode 18 (capacitance-forming portion 22) through the opening 240P in the light-blocking portion 24, this structure enables the curved surface 32A of the projection 32 to reflect the external light in a diffusing manner. This diffusion of the reflected light by the gate line 19 and the capacitor line 21 makes it difficult to visually recognize the gate line 19 and the capacitor line 21 from the outside, thereby preventing the black-displayed pixel PX from being brightly recognized. Consequently, contrast performance is maintained at satisfactory levels. Hence, display quality is restrained from falling due to reflection of external light by the gate line 19 and the capacitor line 21. Besides, the gate line 19 and the capacitor line 21 do not require, for example, an additional metal film for reduced reflection or an additional barrier metal for restrained alloying as in conventional examples.

The plurality of projections 32 on the gate line 19 and the capacitor line 21 are two-dimensionally arranged in a random manner along the main face of the array substrate 12 as shown in FIGS. 5 and 6. To describe it in more detail, on the main face of the array substrate 12, every two adjacent ones of the projections 32 are irregular in both arrangement direction and interval therebetween. The minimum value of the intervals separating the two adjacent projections 32 is smaller than the width of both the gate line 19 and the capacitor line 21. For these reasons, the plurality of projections 32 include both a plurality of projections 32 provided at intervals in the X-axis direction, which is the length direction of the gate line 19 and the capacitor line 21, and a plurality of projections 32 provided at intervals in the Y-axis direction, which is the width direction of the gate line 19 and the capacitor line 21. This structure enables the curved surfaces 32A on the surfaces of the plurality of projections 32, which are provided at intervals in both the length and width directions of the gate line 19 and the capacitor line 21, to reflect external light in a diffusing manner, which makes it difficult to visually recognize the gate line 19 and the capacitor line 21 from the outside. Hence, display quality is suitably restrained from falling due to reflection of external light by the gate line 19 and the capacitor line 21. Note that a flat face may be present between the two adjacent projections 32 on the gate line 19 and the capacitor line 21. Although external light may undergo specular reflection on the flat face, the plurality of profections 32 are present around the flat face. Therefore, if external light is reflected in a diffusing manner by the curved surfaces 32A of the plurality of projections 32 around the flat face, it becomes difficult to visually recognize the gate line 19 and the capacitor line 21 from the outside in a sufficient manner.

The underlying portions 33, disposed on the underlying side of the gate line 19 and the capacitor line 21, are provided on the main face of the array substrate 12 as shown in FIG. 6. Each underlying portion 33 includes the underlying film 27 disposed on the underlying side of the first metal film that provides the gate line 19 and the capacitor line 21. The plurality of underlying portions 33 are disposed in locations that overlap the plurality of projections 32. In this structure, those parts of the gate line 19 and the capacitor line 21 that overlap the underlying portions 33 run on the underlying portions 33, thereby forming the projections 32. The disposition of the plurality of underlying portions 33 on the main face of the array substrate 12 facilitates the provision of the plurality of projections 32 on the gate line 19 and the capacitor line 21.

The underlying portions 33 have a height smaller than the thickness of the gate line 19 and the capacitor line 21 as shown in FIG. 6. Specifically, the thickness of the gate line 19 and the capacitor line 21 is, for example, approximately from 150 nm to 450 nm, whereas the height of the underlying portions 33 is, for example, approximately from 100 nm to 250 nm. More particularly, the ratio of the height of the underlying portions 33 to the thickness the gate line 19 and the capacitor line 21 is in a range of 0.22 to 1.67. If the ratio of the height of the underlying portions 33 to the thickness of the gate line 19 and the capacitor line 21 is smaller than 0.22, those parts of the gate line 19 and the capacitor line 21 which overlap the underlying portions 33 are unfavorably more likely to hardly protrude. If the ratio of the height of the underlying portions 33 to the thickness of the gate line 19 and the capacitor line 21 exceeds 1.67, the curved surfaces 32A could unfavorably be more unlikely to be formed on the surfaces of the projections 32 on the gate line 19 and the capacitor line 21. In contrast, if the ratio of the height of the underlying portions 33 to the thickness of the gate line 19 and the capacitor line 21 is in the range of 0.22 to 1.67, the gate line 19 and the capacitor line 21 are more reliably provided with the projections 32, and the curved surfaces 32A are more reliably provided on the surfaces of the projections 32. In addition, the underlying portions 33 have a width of, for example, approximately from 40 nm to 150 nm. Additionally, each underlying portion 33 is separated from the adjacent underlying portion 33 by an interval of, for example, approximately 1 µm.

The present embodiment includes the structure described here. A description is given next of a method of manufacturing the liquid crystal panel 10. To manufacture the liquid crystal panel 10, the opposite substrate 11 and the array substrate 12 are each prepared by known photolithography. With the main faces of the opposite substrate 11 and the array substrate 12 thus prepared being placed opposite to each other and with the liquid crystal layer 15 and the sealing section 16 being interposed therebetween, the opposite substrate 11 and the array substrate 12 are attached together. The following description will describe a part of the manufacturing process of the array substrate 12 (from patterning of the underlying portions 33 up to formation of the gate insulating film 28) with reference to FIGS. 7 to 10. Note that FIGS. 7 to 10 show the capacitor lines 21 as an example of the gate lines 19 and the capacitor lines 21 that have the projections 32. The same description applies to the gate lines 19.

Figure 7:
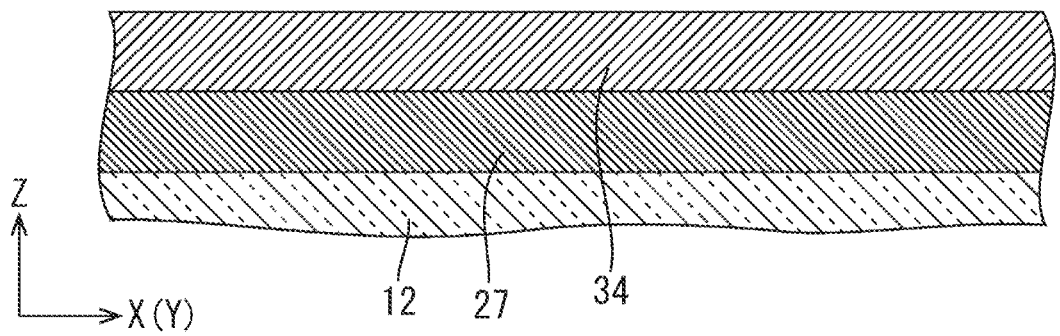
FIG. 7 is a cross-sectional view of an underlying film and a transparent electrode film having been formed in a first film forming step and a second film forming step of a method of manufacturing the array substrate.

First, the underlying film 27 is formed on the surface of the array substrate 12 (first film forming step). Thereafter, as shown in FIG. 7, a transparent electrode film 34 is formed on the overlying side of the underlying film 27 (second film forming step). The transparent electrode film 34 formed here is made of a transparent electrode material (e.g., ITO (indium tin oxide) or IZO (indium zinc oxide)) similarly to the first transparent electrode film and the second transparent electrode film. In the present embodiment, ITO is used as the transparent electrode material for the transparent electrode film 34. The ITO, which is the transparent electrode material for the transparent electrode film 34, contains indium oxide ($In_2O_3$) and tin oxide ($SnO_2$). The tin oxide accounts for appropriately 10 wt % of the ITO. The transparent electrode film 34 formed is amorphous and not crystallized.

Thereafter, the array substrate 12 is subjected to an annealing process (heating process, crystallization process) to partially crystallize the transparent electrode film 34 (partial crystallization step). In the annealing process, the amorphous transparent electrode film 34 is heated at 150° C. to 300° C. for at least 20 minutes. If the transparent electrode film 34 is heated below 150° C. or for less than 20 minutes, the amorphous transparent electrode film 34 is more likely to not crystallize at all or not thoroughly crystallize. If the transparent electrode film 34 is heated at or above 300° C., the transparent electrode film 34 is more likely to excessively crystallize. In contrast, the heating of the transparent electrode film 34 at 150° C. to 300° C. for at least 20 minutes causes the transparent electrode film 34 to partially crystallize in a suitable manner.

Figure 8:
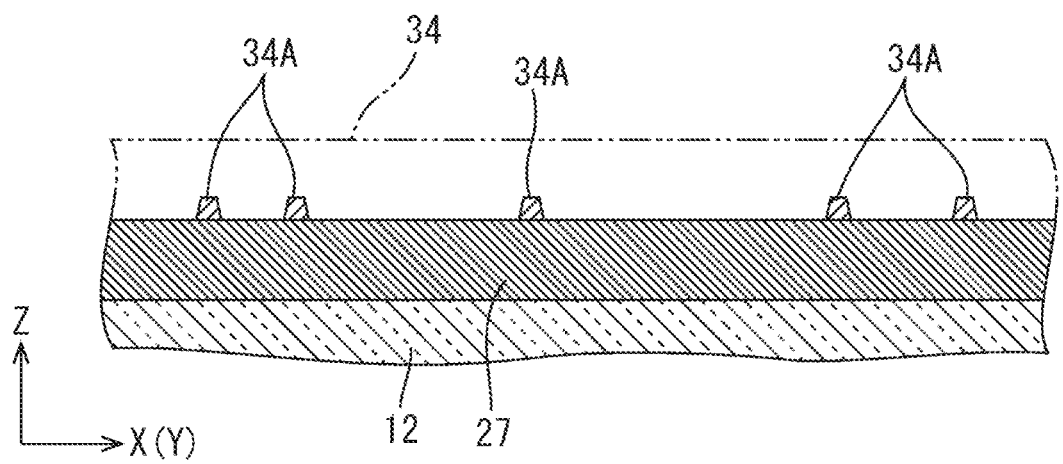
FIG. 8 is a cross-sectional view of the transparent electrode film having been etched in a first etching step of the method of manufacturing the array substrate.

Next, the partially crystallized transparent electrode film 34 is wet etched (first etching step). Then, as shown in FIG. 8, the amorphous parts of the transparent electrode film 34 are selectively removed, and the crystallized parts (hereinafter, "crystallized portions 34A") are selectively left unremoved. Note that FIG. 8 shows the shape of the surface of the transparent electrode film 34 that is yet to be wet etched by dash-double-dot lines. The remaining, crystallized portions 34A of the transparent electrode film 34 protrude in the front side from the underlying film 27. The plurality of crystallized portions 34A of the transparent electrode film 34 are two-dimensionally arranged in a random manner along the main face of the array substrate 12. In addition, for example, the height and the size (diameter) as viewed in plan of the crystallized portions 34A of the transparent electrode film 34 change in accordance with conditions in the annealing process and tend to grow with increasing heating time and increasing heating temperature. FIG. 8 shows an example where the height of the crystallized portions 34A is smaller than the thickness of the transparent electrode film 34.

Figure 9:
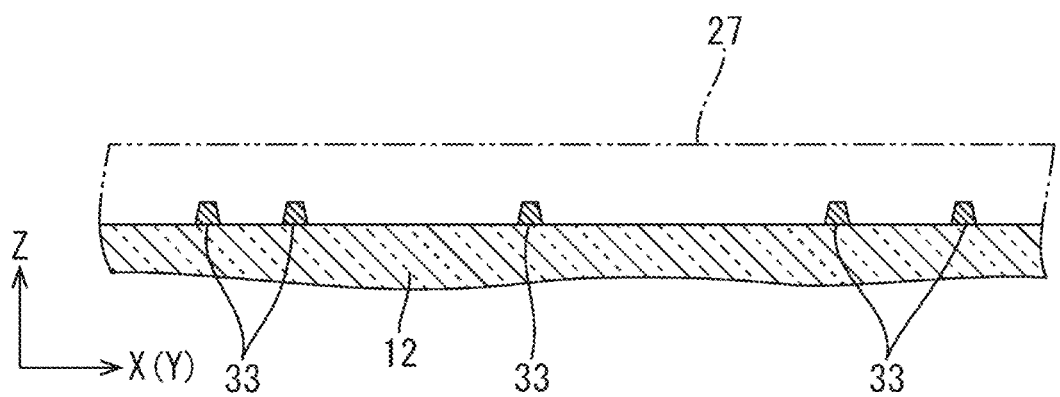
FIG. 9 is a cross-sectional view of the underlying film having been etched in a second etching step of the method of manufacturing the array substrate.

Subsequently, the underlying film 27 is dry etched using the crystallized portions 34A of the transparent electrode film 34 as a mask (second etching step). Then, those parts of the underlying film 27 which do not overlap the crystallized portions 34A are selectively removed, and those parts which overlap the crystallized portions 34A are selectively left unremoved. Thereafter, as shown in FIG. 9, the crystallized portions 34A of the transparent electrode film 34 are removed by ashing (ashing step). This step completely removes the transparent electrode film 34 from the array substrate 12. Note that FIG. 9 shows the shape of the surface of the underlying film 27 that is yet to be dry etched by dash-double-dot lines. Those parts of the underlying film 27 which are left unremoved in the dry etching form the underlying portions 33. The provision of the underlying portions 33 by this patterning of the underlying film 27 using as a mask the crystallized portions 34A of the partially crystallized transparent electrode film 34 enables readily providing the fine and randomly arranged underlying portions 33. The width and height, among others, of the underlying portions 33 can be adjusted in a suitable manner by controlling, for example, the time and output in the dry etching of the underlying film 27.

Figure 10:
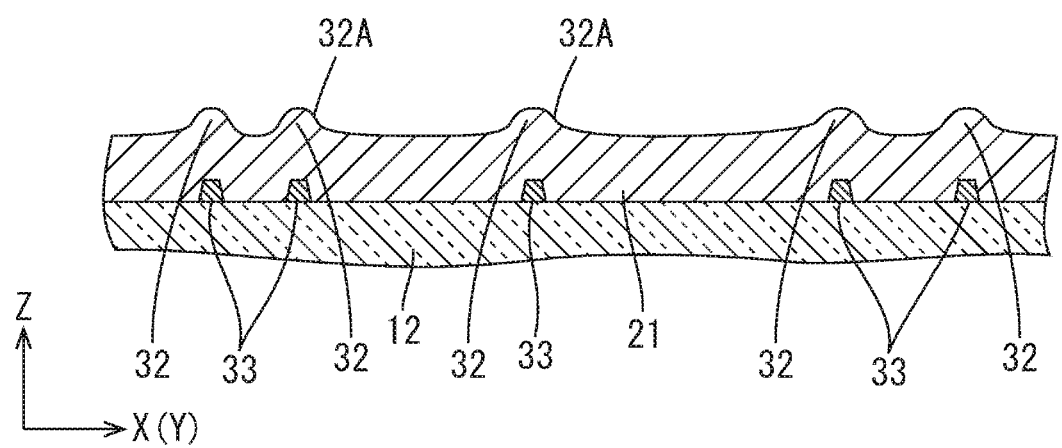
FIG. 10 is a cross-sectional view of a first metal film having been etched in a third etching step of the method of manufacturing the array substrate.

Thereafter, the first metal film and a resist film are sequentially formed on the overlying side of the underlying portions 33. Thereafter, the photoresist film is exposed to light and developed using an exposure unit and a photomask, and the first metal film is wet etched via the developed photoresist film (third etching step). Then, the capacitor lines 21 are formed as shown in FIG. 10. In so doing, the gate lines 19 and the gate electrodes 17A of the TFTs 17 are also formed (see FIG. 2). Note that the photoresist film is removed by ashing. Since the plurality of underlying portions 33 are provided at least both on the underlying side of the capacitor lines 21 and on the underlying side of the gate lines 19, those parts of the capacitor lines 21 and the gate lines 19 which overlap the underlying portions 33 end up running on the underlying portions 33. Hence, those parts of the capacitor lines 21 and the gate lines 19 which overlap the underlying portions 33 become the projections 32 which protrude toward the front side relative to those parts which do no overlap the underlying portions 33. Since the ratio of the height of the underlying portions 33 to the thickness of the gate lines 19 and the capacitor lines 21 is in a range of 0.22 to 1.67, the formed surfaces of the projections 32 substantially entirely become the semi-spherical, curved surfaces 32A. Thereafter, the gate insulating film 28 and a photoresist film are sequentially formed, the photoresist film is exposed to light and developed using an exposure unit and a photomask, and the gate insulating film 28 is dry etched via the developed photoresist film as shown in FIG. 6 (fourth etching step). Thereafter, the semiconductor film, the second metal film, the first interlayer insulating film 29, the planarization film 30, the first transparent electrode film, the second interlayer insulating film 31, the second transparent electrode film, and the alignment film are sequentially formed and patterned to complete the manufacture of the array substrate 12.

Figure 11:
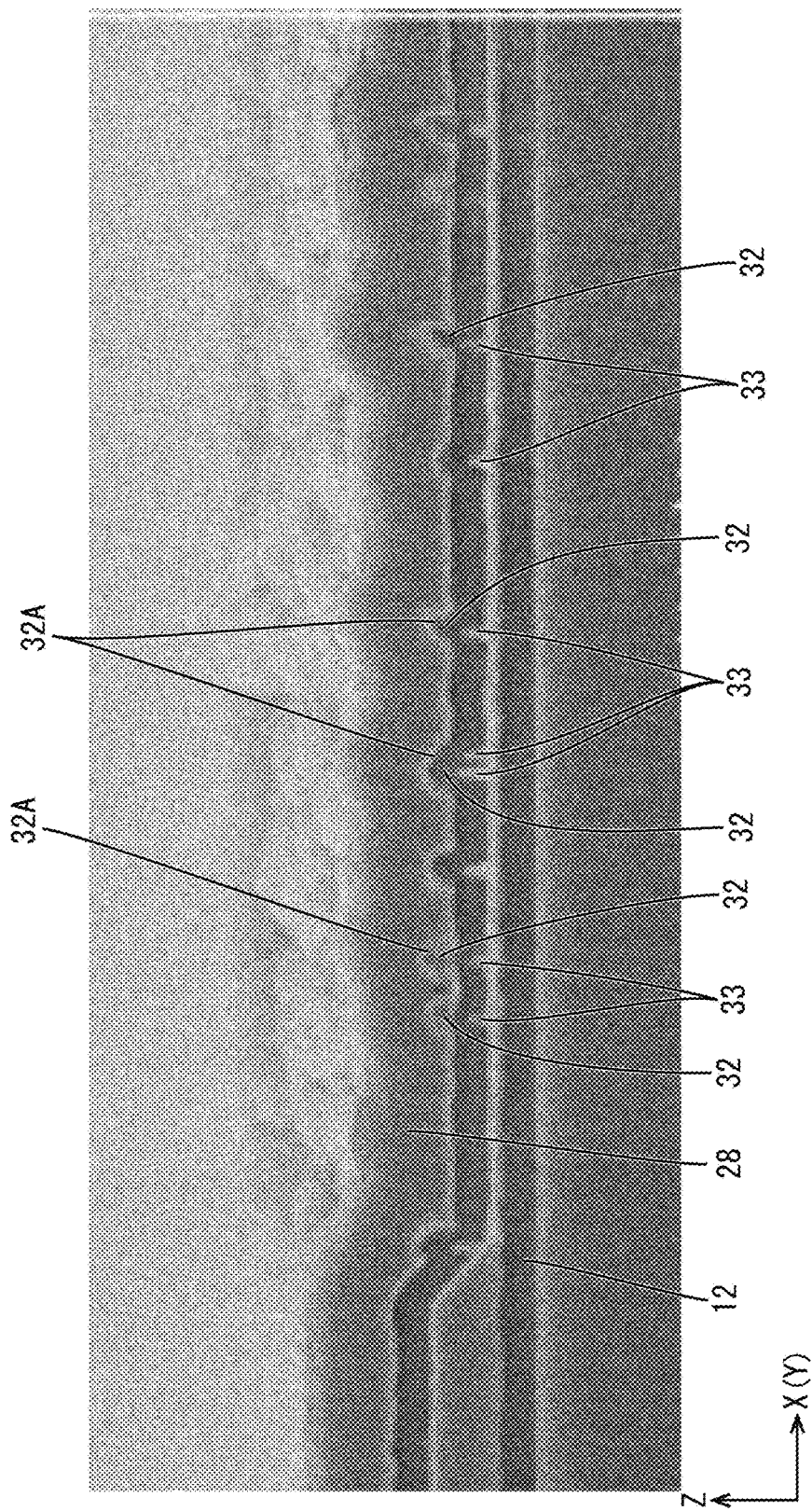
FIG. 11 is a drawing representing a scanning electron microscopy image of a neighborhood of a gate line in the manufactured array substrate.

FIG. 11 shows an image, captured by scanning electron microscope (SEM), of a neighborhood of the gate lines 19 on the array substrate 12 manufactured by the manufacturing method described above. The length in the left and right direction in the image shown in FIG. 11 is approximately 10 FIG. 11 demonstrates that the plurality of underlying portions 33 are randomly arranged at intervals in the left and right direction of FIG. 11. FIG. 11 demonstrates that those parts of the gate lines 19 arranged on the overlying side of the plurality of underlying portions 33 which overlap the underlying portions 33 become the plurality of projections 32 protruding on the front side. Then, FIG. 11 demonstrates that the surfaces of the plurality of projections 32 become the curved surfaces 32A. The curved surfaces 32A of these projections 32 can reflect external light in a diffusing manner.

As described above, the liquid crystal panel (display device) 10 in accordance with the present embodiment includes: the opposite substrate (first substrate) 11; the array substrate (second substrate) 12 having a main face opposite the main face of the opposite substrate 11; the light-blocking portion 24 disposed on the main face of the opposite substrate 11, having the openings 240P, and blocking light; the pixels PX disposed on the main faces of the opposite substrate 11 and the array substrate 12 and delimited by at least parts of the openings 240P; and the gate lines 19 and the capacitor lines 21 which are wiring lines that at least partially overlap the openings 240P on the main face of the array substrate 12, wherein the gate lines 19 and the capacitor lines 21, which are wiring lines, have the projections 32 protruding toward the opposite substrate 11 side, and the plurality of projections 32 are disposed at intervals from each other in locations overlapping at least the openings 240P and include the curved surfaces 32A on the surfaces thereof.

The pixels PX, which are delimited by at least parts of the openings 240P in the light-blocking portion 24, enable an image display. Since the light-blocking portion 24 is formed so that the openings 240P overlap at least parts of the gate lines 19 and the capacitor lines 21, which are wiring lines, the aperture ratio of the pixels PX can be improved. Since the gate lines 19 and the capacitor lines 21, which are wiring lines, are disposed at least partially overlapping the openings 240P in the light-blocking portion 24, reflection of external light by those parts which overlap the openings 240P could unfavorably lower the display quality due to the reflected light. In contrast, since the plurality of projections 32 on the gate lines 19 and the capacitor lines 21, which are wiring lines, are disposed at intervals from each other in locations overlapping at least the openings 240P in the light-blocking portion 24 and have surfaces that include the curved surfaces 32A, external light can be reflected in a diffusing manner by the curved surfaces 32A. This diffusing reflection of light by the gate lines 19 and the capacitor lines 21, which are wiring lines, makes it difficult to visually recognize the gate lines 19 and the capacitor lines 21, which are wiring lines, from the outside. Hence, display quality is restrained from falling due to reflection of external light by the gate lines 19 and the capacitor lines 21, which are wiring lines. The gate lines 19 and the capacitor lines 21, which are wiring lines, do not require, for example, an additional metal film for reduced reflection or an additional barrier metal for restrained alloying as in conventional examples.

In addition, the underlying portions 33, disposed on the underlying side of the gate lines 19 and the capacitor lines 21, which are wiring lines, are provided on the main face of the array substrate 12, and the plurality of underlying portions 33 are disposed in locations overlapping the plurality of projections 32. The parts of the gate lines 19 and the capacitor lines 21, which are wiring lines, which overlap the underlying portions 33 run on the underlying portions 33, thereby forming the projections 32. The provision of the plurality of underlying portions 33 on the main face of the array substrate 12 enables the provision of the plurality of projections 32 on the gate lines 19 and the capacitor lines 21, which are wiring lines.

In addition, the underlying portions 33 are such that the ratio of the height thereof to the thickness of the gate lines 19 and the capacitor lines 21, which are wiring lines, is from 0.22 to 1.67. If the ratio of the height of the underlying portions 33 to the thickness of the gate lines 19 and the capacitor lines 21, which are wiring lines, is less than 0.22, those parts of the gate lines 19 and the capacitor lines 21, which are wiring lines, which overlap the underlying portions 33 are unfavorably more likely to hardly protrude. If the ratio of the height of the underlying portions 33 to the thickness of the gate lines 19 and the capacitor lines 21, which are wiring lines, exceeds 1.67, the curved surfaces 32A could unfavorably be more unlikely to be formed on the surfaces of the projections 32 on the gate lines 19 and the capacitor lines 21, which are wiring lines. In contrast, if the ratio of the height of the underlying portions 33 to the thickness of the gate lines 19 and the capacitor lines 21, which are wiring lines, is in the range of 0.22 to 1.67, the gate lines 19 and the capacitor lines 21, which are wiring lines, are sufficiently reliably provided with the projections 32, and the curved surfaces 32A are sufficiently reliably provided on the surfaces of the projections 32.

In addition, the plurality of projections 32 are disposed at intervals from each other in both the length and width directions of the gate lines 19 and the capacitor lines 21, which are wiring lines, and these intervals are shorter than the width of the gate lines 19 and the capacitor lines 21, which are wiring lines. The reflection of external light in a diffusing manner by the curved surfaces 32A included in the surfaces of the plurality of projections 32 disposed at intervals in both the length and width directions of the gate lines 19 and the capacitor lines 21, which are wiring lines, makes it difficult to visually recognize the gate lines 19 and the capacitor lines 21, which are wiring lines, from the outside. Hence, display quality is suitably restrained from falling due to reflection of external light by the gate lines 19 and the capacitor lines 21, which are wiring lines.

The method of manufacturing the liquid crystal panel 10 in accordance with the present embodiment: provides, on the main face of the opposite substrate 11, the light-blocking portion 24 that blocks light and that includes the openings 240P at least partially delimiting the pixels PX; provides the gate lines 19 and the capacitor lines 21, which are wiring lines at least partially overlapping the openings 240P, on the main face of the array substrate 12; places the main faces of the opposite substrate 11 and the array substrate 12 opposite to each other; and provides the plurality of projections 32 at intervals from each other in locations overlapping at least the openings 240P on parts of the gate lines 19 and the capacitor lines 21, which are wiring lines, the plurality of projections 32 protruding toward the opposite substrate 11 side and including the curved surfaces 32A on the surfaces thereof.

After the light-blocking portion 24 is provided on the main face of the opposite substrate 11, and the gate lines 19 and the capacitor lines 21, which are wiring lines, are provided on the main face of the array substrate 12, the main faces of the opposite substrate 11 and the array substrate 12 are placed opposite to each other, to complete the manufacture of the liquid crystal panel 10. Since the light-blocking portion 24 is formed so that the openings 240P overlap at least parts of the gate lines 19 and the capacitor lines 21, which are wiring lines, the aperture ratio of the pixels PX can be improved. Since the gate lines 19 and the capacitor lines 21, which are wiring lines, are disposed at least partially overlapping the openings 240P in the light-blocking portion 24, reflection of external light by those parts which overlap the openings 240P could unfavorably lower the display quality due to the reflected light. In contrast, since in providing the gate lines 19 and the capacitor lines 21, which are wiring lines, the plurality of projections 32 are provided at intervals from each other in locations overlapping at least the openings 240P on parts of the gate lines 19 and the capacitor lines 21, which are wiring lines, the plurality of projections 32 protruding toward the opposite substrate 11 side and including the curved surfaces 32A on the surfaces thereof, external light can be reflected in a diffusing manner by the curved surfaces 32A of the projections 32. This diffusing reflection of light by the gate lines 19 and the capacitor lines 21, which are wiring lines, makes it difficult to visually recognize the gate lines 19 and the capacitor lines 21, which are wiring lines, from the outside. Hence, display quality is restrained from falling due to reflection of external light by the gate lines 19 and the capacitor lines 21, which are wiring lines. The gate lines 19 and the capacitor lines 21, which are wiring lines, do not require, for example, an additional metal film for reduced reflection or an additional barrier metal for restrained alloying as in conventional examples.

In addition, before the gate lines 19 and the capacitor lines 21, which are wiring lines, are provided on the array substrate 12, the underlying film 27 is formed and patterned to provide the plurality of underlying portions 33 disposed at intervals from each other. By forming and patterning the underlying film 27, the gate lines 19 and the capacitor lines 21, which are wiring lines, are provided after the plurality of underlying portions 33 are provided. Then, those parts of the gate lines 19 and the capacitor lines 21, which are wiring lines, which overlap the plurality of underlying portions 33 end up running on the underlying portions 33, thereby forming the plurality of projections 32.

In addition, the amorphous transparent electrode film 34 is formed after the underlying film 27 is formed on the array substrate 12; the amorphous parts of the transparent electrode film 34 are selectively removed after the transparent electrode film 34 is partially crystallized; and the underlying film 27 is etched using the remaining, crystallized parts as a mask. The amorphous, transparent electrode film 34 is formed, and the transparent electrode film 34 is partially crystallized. The amorphous parts of the transparent electrode film 34 are selectively removed, and the crystallized parts are left unremoved. The underlying film 27 is etched using as a mask the remaining, crystallized parts of the transparent electrode film 34, to prepare the underlying portions 33. The employment of this technique of partially crystallizing the amorphous transparent electrode film 34 enables readily providing the fine underlying portions 33 which exceeds the resolution limits of photomasks used in photolithography.

In addition, in partially crystallizing the transparent electrode film 34, the transparent electrode film 34 is heated at 150° C. to 300° C. for at least 20 minutes. If the transparent electrode film 34 is heated below 150° C. or for less than 20 minutes, the amorphous transparent electrode film 34 is more likely to not thoroughly crystallize. If the transparent electrode film 34 is heated at or above 300° C., the transparent electrode film 34 is more likely to excessively crystallize. In contrast, the heating of the transparent electrode film 34 at 150° C. to 300° C. for at least 20 minutes causes the transparent electrode film 34 to partially crystallize in a suitable manner. Hence, the fine underlying portions 33 can be more readily provided.

Embodiment 2

Embodiment 2 is now described with reference to FIGS. 12 to 17. This Embodiment 2 discusses a variation of a manufacturing process of an array substrate 112. No description will be repeated on the same structure, operation, and effects as those in the Embodiment 1 above.

In the present embodiment, a patterned photoresist film 35 is used as a mask in etching an underlying film 127 in the manufacture of the array substrate 112. A description is given of a specific process of manufacturing the array substrate 112 with reference to FIGS. 12 to 17.

Figure 12:
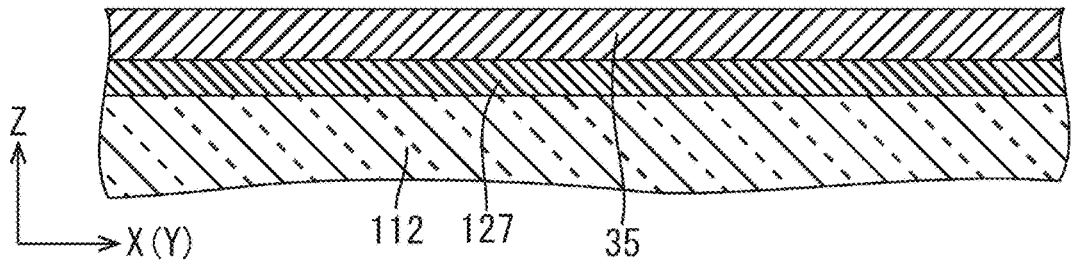
FIG. 12 is a cross-sectional view of an underlying film and a photoresist film having been formed in a first film forming step and a second film forming step of a method of manufacturing an array substrate in accordance with Embodiment 2.
Figure 13:
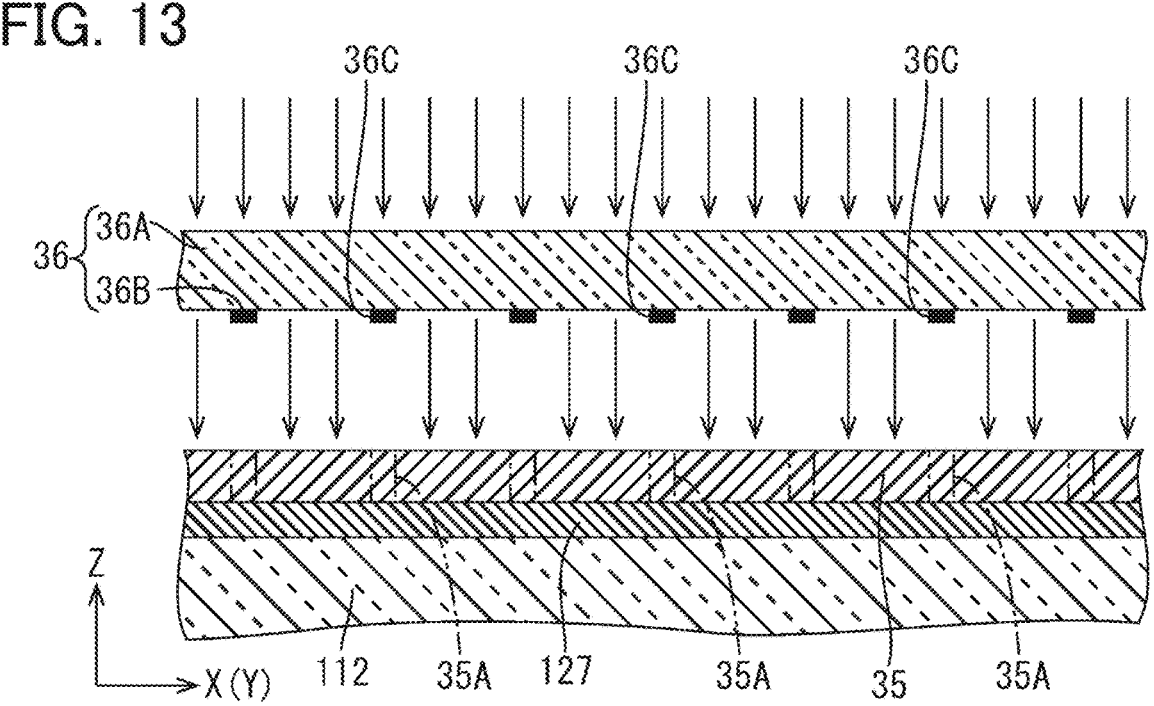
FIG. 13 is a cross-sectional view of the photoresist film having been exposed to light in a first exposure step of the method of manufacturing the array substrate.

The underlying film 127 is formed on the surface of the array substrate 112 (first film forming step), and subsequently, the photoresist film 35 is formed on the overlying side of the underlying film 127 as shown in FIG. 12 (second film forming step). In the present embodiment, the photoresist film 35 is made of a positive photosensitive resist material. Thereafter, as shown in FIG. 13, the photoresist film 35 is exposed to light using an exposure unit and a photomask 36 (first exposure step). A description is given now of the photomask 36 used here. The photomask 36 includes: a transparent base member 36A that has sufficiently high transparence; and a light-blocking film 36B formed on the substrate face of the base member 36A. The light-blocking film 36B blocks the exposure light from a light source in the exposure unit and has partial openings 36C. The photomask 36 has: a light-blocking, blocking region that is the region where the light-blocking film 36B is provided; and light-transmitting, transmission regions that are the regions where the openings 36C are provided (regions where the light-blocking film 36B is not provided). The light-blocking film 36B is disposed in locations overlapping underlying portions 133 on the array substrate 112 (see FIG. 15). The openings 36C are provided in locations not overlapping the underlying portions 133 on the array substrate 112.

Figure 14:
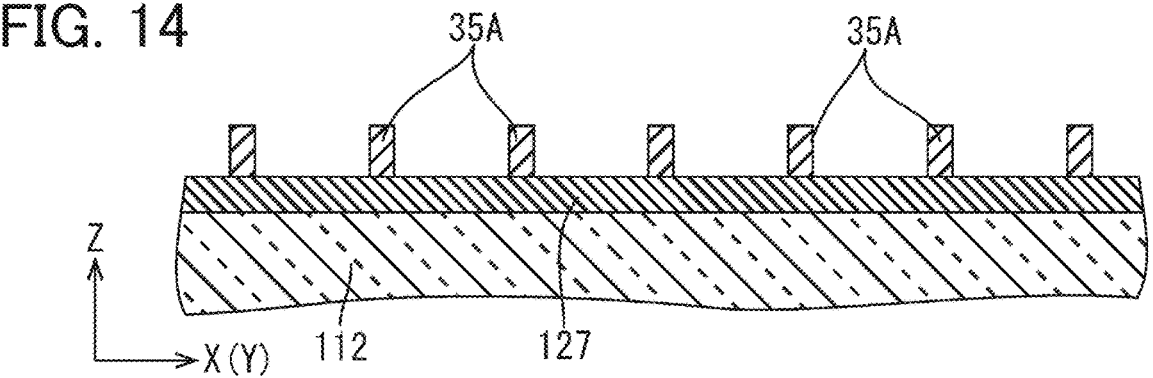
FIG. 14 is a cross-sectional view of the photoresist film having been developed in a first development step of the method of manufacturing the array substrate.

In the first exposure step, the photoresist film 35 is selectively exposed to light via the photomask 36 of such a structure. Thereafter, as shown in FIG. 14, as the photoresist film 35 is developed, those parts of the photoresist film 35 which are exposed to light (those parts which overlap the openings 36C of the photomask 36) are removed because these parts are quickly dissolved by a development solution, that is, the parts has a high dissolution rate. In contrast, those parts of the photoresist film 35 which are not exposed to light (those parts which overlap the light-blocking film 36B of the photomask 36) have a low dissolution rate and are left unremoved. The photoresist film 35 is patterned using the photomask 36 in this manner. The photoresist film 35 has residual portions 35A that has a size and configuration in accordance with the pattern design of the light-blocking film 36B in the photomask 36. Therefore, the method of manufacturing in accordance with the present embodiment provides a greater design freedom for the residual portions 35A of the photoresist film 35 than Embodiment 1 described above. Although FIG. 14 discusses an example where all the plurality of residual portions 35A have the same size and are arranged at equal intervals, for example, the specific size and configuration of the residual portions 35A shown in the figure may be changed where appropriate.

Figure 15:
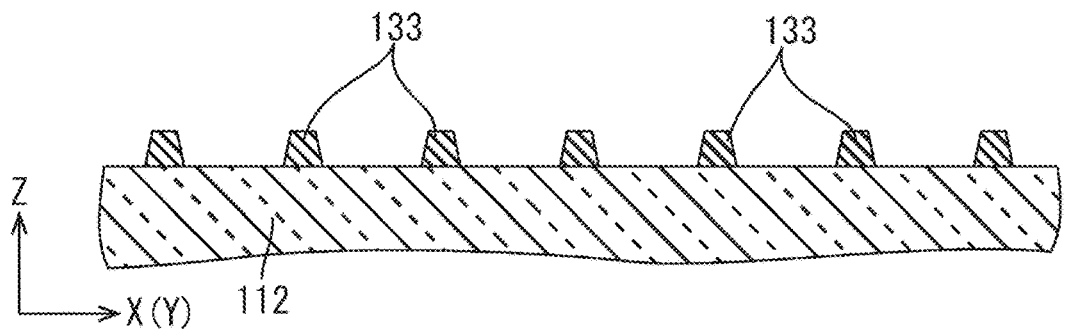
FIG. 15 is a cross-sectional view of an underlying film having been etched in a first etching step of the method of manufacturing the array substrate.

Subsequently, the underlying film 127 is dry etched using the residual portions 35A of the photoresist film 35 as a mask (first etching step). Then, those parts of the underlying film 127 which do not overlap the residual portions 35A are selectively removed, and those parts which overlap the residual portions 35A are selectively left unremoved. Thereafter, as shown in FIG. 15, the residual portions 35A of the photoresist film 35 are removed by ashing (ashing step). This step completely removes the photoresist film 35 from the array substrate 112. Those parts of the underlying film 127 which are left unremoved in the dry etching form the underlying portions 133. For example, the size and configuration of the underlying portions 133 formed reflect the pattern of the residual portions 35A of the photoresist film 35. Since the design freedom for the residual portions 35A of the photoresist film 35 is sufficiently increased as described above, the design freedom for the underlying portions 133 is also sufficiently increased. It hence becomes possible to selectively provide the underlying portions 133 only in those parts of, for example, the gate lines 19 and capacitor lines 121 which overlap the openings 240P in the light-blocking portion 24 (see FIG. 3). The configuration of the underlying portions 133 may be changed where appropriate in other fashions.

Figure 16:
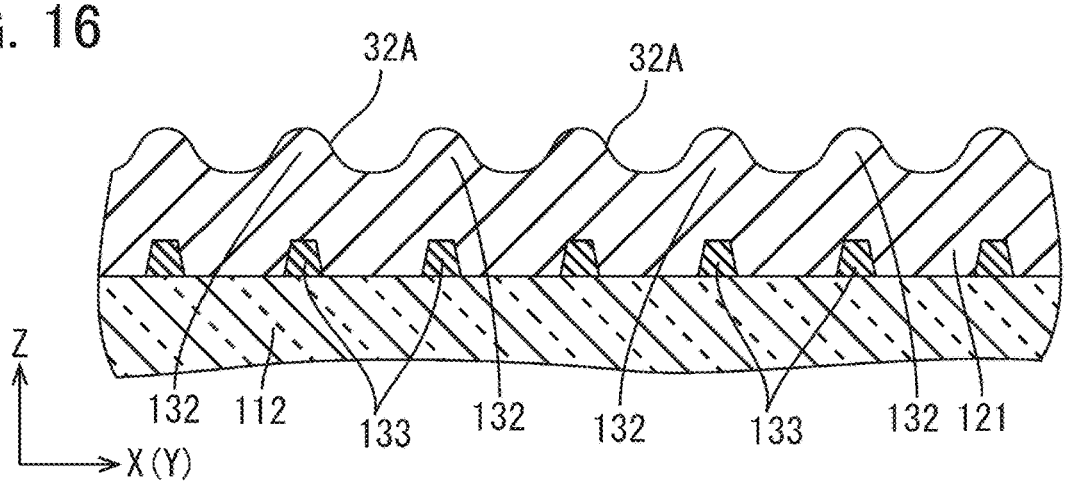
FIG. 16 is a cross-sectional view of a first metal film having been etched in a second etching step of the method of manufacturing the array substrate.
Figure 17:
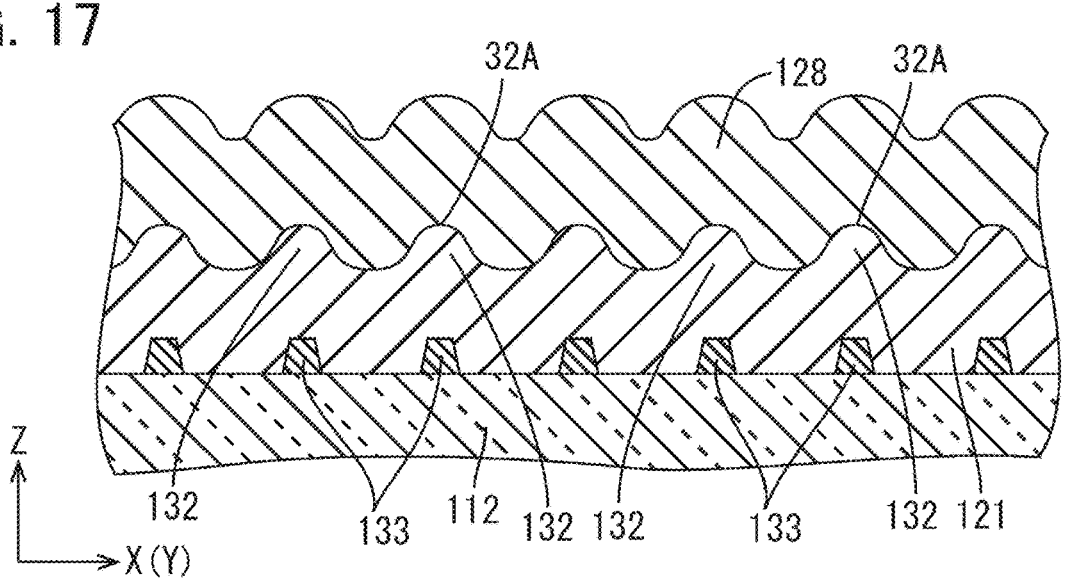
FIG. 17 is a cross-sectional view of a gate insulating film having been etched in a third etching step of the method of manufacturing the array substrate.

Thereafter, the first metal film and a resist film are sequentially formed on the overlying side of the underlying portions 133. Thereafter, the photoresist film is exposed to light and developed using an exposure unit and a photomask, and the first metal film is wet etched via the developed photoresist film (second etching step). Then, the capacitor lines 121 are formed as shown in FIG. 16. In so doing, the gate lines 19 and the gate electrodes 17A of the TFTs 17 are also formed (see FIG. 2). Note that the photoresist film is removed by ashing. Since the plurality of underlying portions 133 are provided at least both on the underlying side of the capacitor lines 121 and the underlying side of the gate lines 19, those parts of the capacitor lines 121 and the gate lines 19 which overlap the underlying portions 133 end up running on the underlying portions 133. Hence, those parts of the capacitor lines 121 and the gate lines 19 which overlap the underlying portions 133 become projections 132 that protrude toward the front side relative to those parts which do not overlap the underlying portions 133. Thereafter, a gate insulating film 128 and a photoresist film are sequentially formed, the photoresist film is exposed to light using the exposure unit and the photomask, and the gate insulating film 128 is dry etched via the developed photoresist film as shown in FIG. 17 (third etching step).

As described above, according to the present embodiment, the photoresist film 35 is formed on the array substrate 112 after the underlying film 127 is formed, the photoresist film 35 is developed after the photoresist film 35 is partially exposed to light, and the underlying film 127 is etched using the developed photoresist film 35 as a mask. The underlying film 127 is etched using the photoresist film 35 patterned by photolithography as a mask, to prepare the underlying portions 133.

Other Embodiments

The technology disclosed in the present specification is not necessarily limited to the foregoing description and embodiments described with reference to drawings. As an example, the following embodiments are also encompassed in the technical scope of the present invention.

(1) The specific numerical values of the height and width of the projections 32, 132 and the specific numerical values of intervals between the projections 32, 132, among others, may be changed in a suitable manner.

(2) The specific number of the projections 32, 132 provided and the specific size and configuration of the projections 32, 132 in a plan view, among others, may be changed in a suitable manner from the examples shown in figures.

(3) The specific shape of the surfaces (including the curved surfaces 32A) of the projections 32, 132, among others, may be changed in a suitable manner from the examples shown in figures. For instance, the surfaces of the projections 32, 132 may partially include a non-curved surface (e.g., a flat face). In other words, the entire surfaces of the projections 32, 132 are not necessarily the curved surfaces 32A.

(4) The specific shape (light-shielding pattern) of the light-blocking portion 24 as projected onto a plane may be changed in a suitable manner. For instance, the light-blocking portion 24 may include only the second light-blocking portion 24B. In other words, the light-blocking portion 24 may be formed like a vertically elongated band that extends in the Y-axis direction. When this is the case, the openings 240P in the light-blocking portion 24 form vertically elongated bands that extend in the Y-axis direction. Therefore, the projections 32, 132 and the underlying portions 33, 133 may be provided at least on those parts of the gate lines 19 and the capacitor lines 21, 121 which overlap the openings 240P shaped like vertically elongated bands that extend in the Y-axis direction.

(5) Besides as in (4) above, the light-blocking portion 24 may include only the first light-blocking portion 24A. In other words, the light-blocking portion 24 may be formed like a horizontally elongated band that extends in the X-axis direction. When this is the case, the openings 240P in the light-blocking portion 24 form horizontally elongated bands that extend in the X-axis direction. Therefore, the projections 32, 132 and the underlying portions 33, 133 may be provided at least on those parts of the gate lines 19, the source lines 20, and the capacitor lines 21, 121 which overlap the openings 240P shaped like horizontally elongated bands that extend in the X-axis direction.

(6) It is also possible in Embodiment 1 to selectively provide the projections 32 in those locations of the gate lines 19 and the capacitor lines 21 which overlap the openings 240P in the light-blocking portion 24.

(7) It is also possible in Embodiment 2 to provide the projections 132 all across the entire regions of the gate lines 19 and the capacitor lines 121.

(8) In Embodiment 1, the specific numerical values of, for example, the heating temperature and time in the partial crystallization step may be changed in a suitable manner.

(9) In Embodiment 1, the transparent electrode film 34 may be dry etched in the first etching step.

(10) In Embodiment 1, the underlying film 27 may be wet etched in the second etching step.

(11) In Embodiment 1, the first metal film may be dry etched in the third etching step.

(12) In Embodiment 1, the gate insulating film 28 may be wet etched in the fourth etching step.

(13) In Embodiment 2, the underlying film 127 may be wet etched in the first etching step.

(14) In Embodiment 2, the first metal film may be dry etched in the second etching step.

(15) In Embodiment 2, the gate insulating film 128 may be wet etched in the third etching step.

(16) In Embodiment 2, the photoresist film 35 used in the patterning of the underlying film 127 may be a negative photosensitive resist material.

(17) The projections 32, 132 may be provided on wiring lines other than the gate lines 19 and the capacitor lines 21, 121. For instance, if the array substrates 12, 112 include a common wiring line for supplying a common potential to the common electrode 26, the projections 32, 132 may be provided on the common wiring line. Besides, if the array substrates 12, 112 include, for example, touch electrodes for touch detection and touch lines for supplying signals to the touch electrodes, the projections 32, 132 may be provided on the touch lines.

(18) The underlying films 27, 127 may be made of a metal material, a transparent electrode material, or a semiconductor material and may be made of an organic material.

(19) The semiconductor film may be made of, for example, amorphous silicon or low-temperature polysilicon.

(20) The color filters 23 may be provided on the array substrates 12, 112. When this is the case, both the pixel electrodes 18 and the color filters 23, which constitute the pixels PX, are provided on the array substrates 12, 112, and no components of the pixels PX are provided on the opposite substrate 11.

(21) The pixels PX may include self-luminous elements provided on the array substrates 12, 112. When this is the case, both the pixel electrodes 18 and the color filters 23 may be omitted, or the pixel electrodes 18 alone may be omitted.

(22) The pixels PX may come in four or more colors. The additional pixels PX may be, for example, yellow pixels capable of emitting yellow light at yellow wavelengths and white pixels capable of emitting light at all wavelengths.

(23) The liquid crystal panel 10 may be able to operate in non-FFS display modes such as IPS (in plane switching) mode, VA (vertical alignment) mode, and TN (twisted nematic) mode.

(24) An organic EL display panel may be used in place of the liquid crystal panel 10.

What is claimed is:

1. A method of manufacturing a display device, the method comprising:

providing a light-blocking portion on a main face of a first substrate, the light-blocking portion blocking light and having an opening at least partially delimiting a pixel;

providing a wiring line on a main face of a second substrate, the wiring line at least partially overlapping the opening;

placing the main faces of the first substrate and the second substrate opposite each other; and providing a plurality of projections at intervals in locations overlapping at least the opening on a part of the wiring line, the plurality of projections protruding toward a first substrate side and having a top surface including a curved surface.

2. The method according to claim 1, further comprising, before the wiring line is provided, forming and patterning an underlying film to provide a plurality of underlying portions at intervals on the second substrate.

3. The method according to claim 2, further comprising:

after the underlying film is formed, forming an amorphous transparent electrode film on the second substrate;

after the amorphous transparent electrode film is partially crystallized, selectively removing amorphous parts of the amorphous transparent electrode film; and etching the underlying film using crystallized parts that are left unremoved as a mask.

4. The method according to claim 3, wherein, in partially crystallizing the amorphous transparent electrode film, the amorphous transparent electrode film is heated at 150° C. to 300° ° C. for at least 20 minutes.

5. The method according to claim 2, further comprising:

after the underlying film is formed, forming a photoresist film on the second substrate;

after the photoresist film is partially exposed to light, developing the photoresist film; and etching the underlying film using the photoresist film that is developed as a mask.

6. A method of manufacturing a display device, the method comprising:

providing a light-blocking portion on a main face of a first substrate, the light-blocking portion blocking light and having an opening at least partially delimiting a pixel;

providing a wiring line on a main face of a second substrate, the wiring line at least partially overlapping the opening;

placing the main faces of the first substrate and the second substrate opposite each other; and providing a plurality of projections at intervals in locations overlapping at least the opening on a part of the wiring line, the plurality of projections protruding toward a first substrate side and having a surface including a curved surface, wherein the plurality of projections is two-dimensionally arranged in a random manner along the main face of the first substrate.

7. The method according to claim 6, wherein, on the main face of the first substrate, every two adjacent projections of the plurality of projections are irregular in both an arrangement direction and an interval therebetween.

8. The method according to claim 7, wherein a minimum value of the intervals separating the two adjacent projections is smaller than a width of the wiring line.

* * * * *